United States Patent [19]
Laughlin

[11] Patent Number: 5,917,641
[45] Date of Patent: Jun. 29, 1999

[54] FRUSTRATED TOTAL INTERNAL REFLECTION DEVICE HAVING A SPACER AND AN ENDPLATE

[75] Inventor: Richard H. Laughlin, Richardson, Tex.

[73] Assignee: Optical Switch Corporation, Richardson, Tex.

[21] Appl. No.: 08/923,954

[22] Filed: Sep. 5, 1997

Related U.S. Application Data

[63] Continuation-in-part of application No. 08/709,090, Sep. 6, 1996, abandoned, which is a continuation-in-part of application No. 08/480,144, Jun. 7, 1995, Pat. No. 5,555,327.

[51] Int. Cl.⁶ .................................................. G02B 26/08
[52] U.S. Cl. .............................. 359/222; 385/16; 385/18
[58] Field of Search ............................ 359/222; 385/16, 385/18

[56] References Cited

U.S. PATENT DOCUMENTS

| | | | |
|---|---|---|---|
| Re. 29,194 | 4/1977 | Ambrose et al. ............ | 355/43 |
| 2,565,514 | 8/1951 | Pajes . | |
| 2,997,922 | 8/1961 | Kaprelian . | |
| 3,338,656 | 8/1967 | Astheimer . | |
| 3,376,092 | 4/1968 | Kushner et al. . | |
| 3,514,183 | 5/1970 | Rabedeau . | |
| 3,520,595 | 7/1970 | Treuthart . | |
| 3,559,101 | 1/1971 | Parker et al. ................ | 332/7.51 |
| 3,649,105 | 3/1972 | Treuthart . | |
| 3,770,347 | 11/1973 | Ambrose et al. ............ | 355/43 |
| 4,026,638 | 5/1977 | Govignon .................. | 351/7 |
| 4,113,360 | 9/1978 | Baur et al. ................. | 359/222 |
| 4,135,791 | 1/1979 | Govignon .................. | 351/7 |
| 4,165,155 | 8/1979 | Gordon, II et al. . | |
| 4,249,814 | 2/1981 | Hull et al. .................. | 354/154 |
| 4,278,327 | 7/1981 | McMahon et al. . | |
| 4,303,302 | 12/1981 | Ramsey et al. . | |
| 4,355,864 | 10/1982 | Soref . | |
| 4,361,911 | 11/1982 | Buser et al. ................ | 455/605 |
| 4,385,799 | 5/1983 | Soref . | |
| 4,498,730 | 2/1985 | Tanaka et al. . | |
| 4,613,203 | 9/1986 | Proetel et al. . | |
| 4,626,066 | 12/1986 | Levinson . | |
| 4,657,339 | 4/1987 | Fick . | |
| 4,714,326 | 12/1987 | Usui et al. . | |
| 4,738,500 | 4/1988 | Grupp et al. . | |
| 4,790,621 | 12/1988 | Calaby et al. . | |
| 4,796,263 | 1/1989 | Rampolla ................... | 372/10 |
| 4,814,600 | 3/1989 | Berström .................... | 250/221 |
| 4,838,637 | 6/1989 | Torok et al. . | |
| 4,927,225 | 5/1990 | Levinson . | |
| 5,031,987 | 7/1991 | Norling . | |
| 5,046,832 | 9/1991 | Bell ............................ | 359/305 |
| 5,111,323 | 5/1992 | Tanaka et al. .............. | 359/139 |
| 5,199,088 | 3/1993 | Magel ........................ | 385/18 |
| 5,204,922 | 4/1993 | Weir et al. .................. | 385/18 |
| 5,208,880 | 5/1993 | Riza et al. .................. | 385/18 |
| 5,221,987 | 6/1993 | Laughlin .................... | 359/222 |
| 5,309,455 | 5/1994 | Adachi et al. .............. | 372/25 |
| 5,323,224 | 6/1994 | Wada ......................... | 356/73.1 |
| 5,343,286 | 8/1994 | Keeble et al. .............. | 356/73.1 |
| 5,361,315 | 11/1994 | Lewis et al. ................ | 385/16 |
| 5,436,986 | 7/1995 | Tsai ............................ | 385/16 |
| 5,444,801 | 8/1995 | Laughlin .................... | 385/16 |
| 5,553,175 | 9/1996 | Laughlin .................... | 385/16 |
| 5,555,327 | 9/1996 | Laughlin .................... | 385/16 |
| 5,555,558 | 9/1996 | Laughlin .................... | 385/16 |
| 5,566,260 | 10/1996 | Laughlin .................... | 385/16 |
| 5,647,033 | 7/1997 | Laughlin | 385/16 |

FOREIGN PATENT DOCUMENTS

| | | |
|---|---|---|
| 0558025A1 | 2/1993 | European Pat. Off. . |
| 61-232412 | 10/1986 | Japan . |
| 1215209 | 12/1970 | United Kingdom . |

OTHER PUBLICATIONS

Dale Murray, et al., "Scalable Optical Switch Using Rotating Refractive Plates," *AMP Incorporated*, 10 pages, presented at the National Fiber Optics Engineers Conference, Sep., 1998.

*Primary Examiner*—James Phan
*Attorney, Agent, or Firm*—Baker & Botts, L.L.P.

[57] ABSTRACT

A device for processing an optical signal includes a refractor with a reflecting surface for reflecting the optical signal by total internal reflection. The device also includes a switchplate and an actuator to place the switchplate into proximal contact with the refractor to frustrate the total internal reflection.

25 Claims, 9 Drawing Sheets

FRUSTRATED TOTAL INTERNAL REFLECTION DEVICE HAVING A SPACER AND AN ENDPLATE

CROSS REFERENCE TO RELATED APPLICATIONS

This application is a continuation-in-part of U.S. patent application Ser. No. 08/709,090, filed Sep. 6, 1996, now abandoned, entitled "Frustrated Total Internal Reflection Device," which is a continuation-in-part of U.S. patent application Ser. No. 08/480,144, entitled "Frustrated Total Internal Reflection Device," filed Jun. 7, 1995, now U.S. Pat. No. 5,555,327. This application is also related to U.S. patent application Ser. No. 08/923,953, entitled "Frustrated Total Internal Reflection Device Having A First Spacer And A Second Spacer."

TECHNICAL FIELD OF THE INVENTION

This invention relates to the field of frustrated total internal reflection (FTIR) devices.

BACKGROUND OF THE INVENTION

U.S. Pat. No. 5,221,987, issued to Laughlin, entitled FTIR Modulator, discloses an apparatus that employs frustrated total internal reflection (FTIR) to modulate and switch beams of light or optical signals. U.S. Pat. No. 5,221,987 is expressly incorporated by reference herein for all purposes.

U.S. Pat. No. 5,221,987, discloses a method of developing frustrated total internal reflection by moving two surfaces into and out of proximal contact with one another. Once these surfaces are brought into proximal contact an electrostatic "bond" is formed between the surfaces. To later separate the surfaces requires breaking the electrostatic bond. Overcoming the bond may add to the difficulty and time required in separating these two surfaces. In one embodiment, U.S. Pat. No. 5,221,987 taught a method of bending one of the surfaces in one plane to address this problem.

The inventor of the inventions disclosed in U.S. Pat. No. 5,221,987 has developed several improvements to the FTIR device disclosed therein that are the subject of this present application.

SUMMARY OF THE INVENTION

In accordance with the present invention, an improved FTIR device is provided that substantially eliminates or reduces disadvantages and problems associated with previously developed FTIR devices.

The present invention provides a device for processing an optical signal having a refractor having a reflecting surface operable to reflect the optical signal by total internal reflection. An actuator has one end coupled to the refractor and an opposing end. An endplate has a first surface coupled to the opposing end of the actuator. A spacer has one end coupled to the first surface of the endplate and an opposing end. A switchplate is coupled to the opposing end of the spacer. The switchplate has a first position spaced apart from the refractor and a second position in proximal contact with the refractor to frustrate the total internal reflection of the optical signal.

The present invention provides numerous technical advantages, including those provided in U.S. Pat. Nos. 5,221,987, 5,444,801, and 5,555,327 which are all expressly incorporated by reference herein for all purposes. Additionally, the present invention provides a technical advantage of a more efficient structure over previously developed FTIR devices. In one embodiment, multiple actuators operate cooperatively to drive a switchplate into and out of proximal contact with a refractor, minimizing the amount of force each individual actuator must supply and enhancing FTIR device performance. Furthermore, in another embodiment, a portion of the contact surface of a switchplate comprises a contact area such that proximal contact of the switchplate with respect to a refractor is limited to the contact area. In this configuration, forces applied by an actuator to the portion of the contact surface that is not in proximal contact with the refractor bend the periphery of the switchplate to produce advantageous peel forces that reduce the time and force necessary to bring the switchplate out of proximal contact with the refractor. Other technical advantages are readily apparent to one skilled in the art from the following figures, descriptions, and claims.

BRIEF DESCRIPTION OF THE DRAWINGS

For a more complete understanding of the present invention and advantages thereof, reference is now made to the following description taken in conjunction with the accompanying drawings in which like reference numbers indicate like features and wherein.

DETAILED DESCRIPTION OF THE INVENTION

Preferred embodiments of the present invention are illustrated in the FIGURES, like numerals being used to refer to like corresponding parts of the various drawings.

Figure 1:
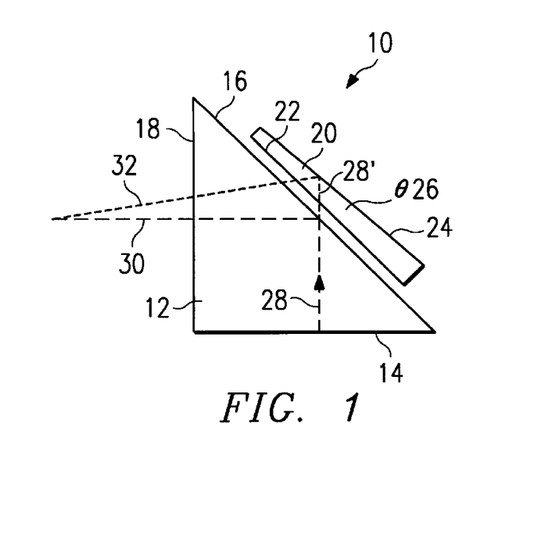
FIG. 1 is a schematic diagram illustrating the reflection of an optical signal in the FTIR device of the present invention.

FIG. 1 shows FTIR device 10 of the present invention. FTIR device 10 includes first refractor 12, hereinafter refractor 12, which is a right angle prism in the embodiment shown in FIG. 1. Refractor 12 may be formed from many suitable refractive materials and may have many configurations without deviating from the inventive concepts of the present invention. First refractor 12 in FIG. 1 has three surfaces, including first or input surface 14, second or reflecting surface 16, and third or output surface 18. In three dimensions, first, second, and third surfaces are generally, but not necessarily, perpendicular with respect to one another.

FTIR device 10 also includes second refractor or switchplate 20 having contact surface 22 and reflective surface 24. Switchplate 20 may be formed from many suitable refractive materials and may have many configurations without deviating from the inventive concepts of the present invention. Reflective surface 24 of switchplate 20 is at bias angle θ26 with respect to contact surface 22. The reflectivity of reflective surface 24 may be caused by total internal reflection or by reflective material. It is noted that reflective surface 24 of switchplate 20 may also be non-reflective or optically absorbing.

The theory behind and operation of FTIR device 10 is fully described in U.S. Pat. Nos. 5,221,987 and 5,444,801, and need not be repeated here for an understanding of the present invention. A summary of the operation of FTIR device 10, however, will be provided.

Switchplate 20 is shown in FIG. 1 as removed or spaced apart from refractor 12. In this position, input optical signal or beam 28 enters refractor 12 at input surface 14. Beam 28 travels in refractor 12 until it reaches reflecting surface 16. Beam 28 is reflected at reflecting surface 16 by total internal reflection (TIR) in accordance with Snell's law as described in U.S. Pat. Nos. 5,221,987 and 5,444,801 forming primary output beam 30 that exits refractor 12 at output surface 18.

In order to change the angle of output beam 30, and in turn, the location of output beam 30 after exiting output surface 18, switchplate 20 is brought into proximal contact with refractor 12. Bringing contact surface 22 of switchplate 20 into proximal contact with reflecting surface 16 of refractor 12 frustrates the total internal reflection in refractor 12. The term proximal contact refers not only to direct contact between refractor 12 and switchplate 20, but also contemplates any spacing or partial contact between refractor 12 and switchplate 20 to frustrate internal reflection to a desired degree. This causes input beam 28' to travel into switchplate 20. In one embodiment, beam 28' is reflected at reflective surface 24 of switchplate 20 as secondary output beam 32. The reflection of beam 28' at reflective surface 24 may or may not be by total internal reflection. Generally, reflective surface 24 may reflect, absorb, or transmit optical beam 28', with or without reflective or absorptive coatings.

As shown in FIG. 1, because optical beam 28' travels into switchplate 20 before reflection at reflective surface 24, secondary output beam 32 may exit output surface 18 of refractor 12 at a different location than primary output beam 30. Where secondary output beam 32 exits output surface 18 with respect to primary output beam 30 is a function of bias angle θ26 of switchplate 20 as is described in U.S. Pat. No. 5,444,801. Alternatively, by varying the thickness of switchplate 20 and angle θ26, primary output beam 30 and secondary output beam 32 can intersect at output surface 18.

Therefore, an input optical signal 28 to FTIR device 10 of FIG. 1, can be processed by switching or modulating the signal. This processing is achieved by moving switchplate 20 with respect to refractor 12. In a first position, switchplate 20 is spaced apart from refractor 12. In a second position, switchplate 20 is in proximal contact with refractor 12 to frustrate the total internal reflection of optical signal 28.

Figure 2:
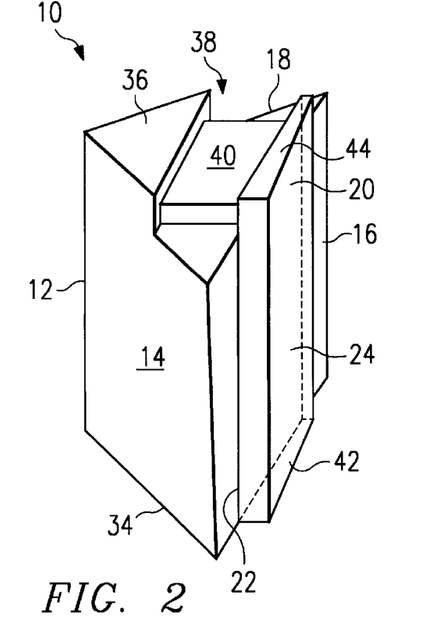
FIG. 2 depicts a perspective view of one embodiment of the FTIR device of the present invention.

FIG. 2 is a perspective view of one embodiment of FTIR device 10 of FIG. 1. The view of FIG. 2 shows bottom surface 34 and top surface 36 of refractor 12. Formed in top surface 36 of refractor 12 is notch 38. Positioned in notch 38 is actuator 40. In one embodiment of FTIR device 10, actuator 40 is a piezoelectrical device that responds to a control signal. The view of FIG. 2 also shows switchplate 20 having first end 42 and second end 44. First end 42 of switchplate 20 is secured to refractor 12. First end 42 of switchplate 20 may be secured to refractor 12 by any suitable mechanism including bonding or clamping. Actuator 40 is disposed in notch 38 of refractor 12 between refractor 12 and second end 44 of switchplate 20.

In the view shown in FIG. 2, switchplate 20 is in proximal contact with refractor 12. As previously described in connection with discussions relating to FIG. 1, in this position a signal entering refractor 12 through input surface 14 will travel in refractor 12 and into switchplate 20 where it will be reflected at reflective surface 24 of switchplate 20. This signal will then exit at output surface 18 of refractor 12.

To change the path of the optical signal, actuator 40 is activated. Activating actuator 40 causes it to expand so that second end 44 of switchplate 20 moves away from refractor 12. Once actuator 40 supplies sufficient force it bends second end 44 causing peel forces to break the electrostatic forces between contact surface 22 of switchplate 20 and reflecting surface 16 of refractor 12. This causes separation between reflecting surface 16 of refractor 12 and contact surface 22 of switchplate 20. Switchplate 20 has a degree of elasticity to it and the initial separation occurring between switchplate 20 and refractor 12 is near actuator 40. This separation propagates towards first end 42 of switchplate 20 where switchplate 20 is attached to refractor 12. Actuator 40, therefore, causes switchplate 20 to peel away from refractor 12 rather than sheering away from refractor 12. This minimizes the amount of force that actuator 40 must supply to move switchplate 20 with respect to actuator 12, minimizes the instantaneous contact area between refractor 12 and switchplate 20, and also minimizes the time necessary to move switchplate 20 with respect to refractor 20.

Once switchplate 20 is spaced apart from refractor 12 a sufficient distance, approximately two times the wavelength (λ) of the beam in FTIR device 10, then input optical beam 28 reflects by total internal reflection at reflecting surface 16 of refractor 12. This causes primary output beam 30 to exit refractor 12 at surface 18 at a new location as was previously described. Deactivating actuator 40 causes it to contract so that switchplate 20 returns to its at-rest position in proximal contact with refractor 12.

Additionally, controlling the amount of expansion provided by actuator 40 in turn controls the separation between switchplate 20 and refractor 12. This allows FTIR device 10 to be used for either switching or modulating the signal input to FTIR device 10.

Attaching switchplate 20 to refractor 12 at first end 42 prevents virtually all lateral movement of switchplate 20 with respect to refractor 12. This prevents abrasions or contusions from forming on reflecting surface 16 of refractor 12 or contact surface 22 of switchplate 20. Abrasions or contusions will affect the efficiency of the total internal reflection at these surfaces and also affect the proximal contact achievable between these surfaces.

Figure 3:
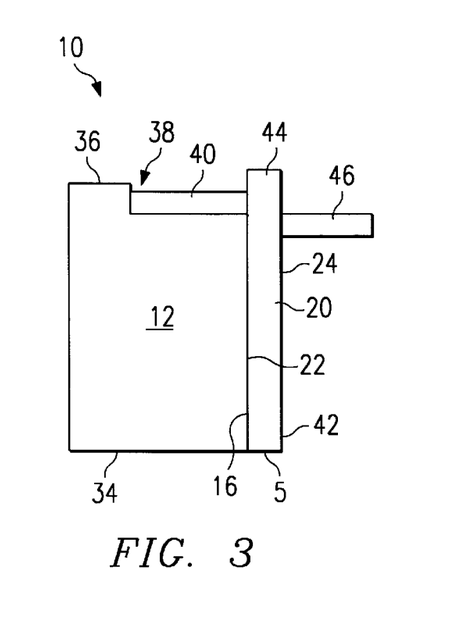
FIG. 3 illustrates a side cross-sectional view of the FTIR device of FIG. 2.

FIG. 3 is a cross-sectional view of FTIR device 10 of FIG. 2 with additional second actuator 46. Second actuator 46 may also be a piezoelectrical device that is responsive to a control signal that is secured to a physical reference. Second actuator 46 provides a driving force to move switchplate 20 into contact with refractor 12. Activating actuator 40 and deactivating actuator 46 moves switchplate 20 away from refractor 12. To return switchplate 20 back into proximal contact with refractor 12, actuator 40 is deactivated and second actuator 46 is activated. Using both actuators to drive switchplate 20 increases the speed at which switchplate 20 can be moved with respect to refractor 12. This allows FTIR device 10 to "switch" faster then previously developed devices.

It is noted that there may be applications of FTIR device 10 where it may be desirable to move switchplate 20 away from refractor 12 a distance sufficient so that a beam traveling in refractor 12 is reflected partially at reflecting surface 16 of refractor 12 and partially at reflective surface 24 of switchplate 20. FTIR device 10 operating in this mode provides a variable beam splitter or attenuator function. When this function is desired both actuators 40 and 46 can be activated a sufficient amount to control the exact spacing between refractor 12 and switchplate 20. This same beam splitter or attenuator function may be incorporated into any embodiments of FTIR device 10.

It is noted that second actuator 46 may be a spring to provide a preloaded stress to switchplate 20 with respect to refractor 12. The spring may be embodied in a cylindrical spring or in a belleville spring. Alternatively, actuator 40 may be embodied in a spring while actuator 46 is embodied in a piezoelectrical device. Either of these configurations provide enhanced switching speeds over previously developed FTIR devices.

Figure 4:
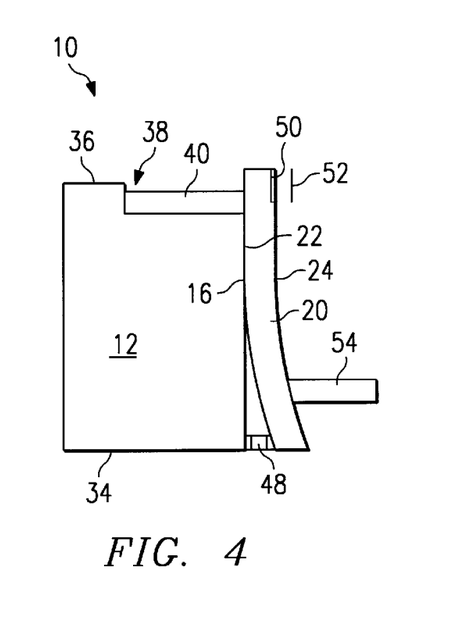
FIG. 4 provides a side cross-sectional view of an alternate embodiment of the present inventive FTIR device having a prestressed switchplate.

FIG. 4 is a cross-sectional view of an alternate embodiment of FTIR device 10. Switchplate 20 is attached at first end 42 to refractor 12 by spacer 48. Switchplate 20 is attached to refractor 12 at first end 42 by bonding or clamping such that switchplate 20 is bent or deflected with respect to refractor 12. The deflection of switchplate 20 provides a force that helps maintain contact surface 22 in proximal contact with reflecting surface 16 of refractor 12. This helps minimize the time necessary for switchplate 20 to return to proximal contact with refractor 12 when actuator 40 is deactivated. This embodiment shown in FIG. 4 can also eliminate the need for second actuator 46 in FIG. 3 or other preloading devices to return switchplate 20 into proximal contact with refractor 12 when actuator 40 is deactivated.

A further enhancement that may be provided to FTIR device 10 is also shown in FIG. 4. Conductive element 50 may be placed on switchplate 20 near second end 44. By placing a second conductive reference 52 near conductive element 50 a capacitor is formed. Second conductive reference 52 should be at a distance that is just greater than the displacement of switchplate 20 when actuator 40 is activated. By measuring the value of the capacitor formed by element 50 and reference 52, the positioning of switchplate 20 can be more accurately controlled. This may be particularly helpful when using any embodiment of FTIR device 10 as a variable splitter or modulator of an optical beam.

Additionally, FTIR device 10 in FIG. 4 may also include preload 54. Preload 54 may be embodied in a clamp or screw. Preload 54 provides a force on switchplate 20 with respect to refractor 12 such that switchplate 20 is deformed in a leaf-spring configuration forcing switchplate 20 against refractor 12.

Figure 5:
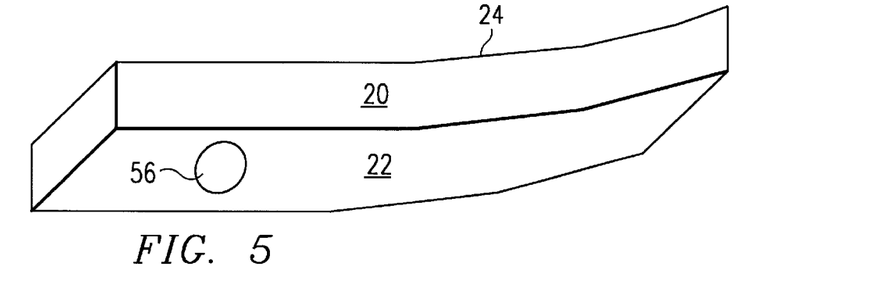
FIG. 5 shows a bottom perspective view of a switchplate having a contact area for use with the present FTIR device.

FIG. 5 is a bottom view of an alternate embodiment of switchplate 20 of FTIR device 10. Even with a super polish on or cleaning of refractor 12 and switchplate 20, however, the surface roughness of contact surface 22 and reflecting surface 16 may be on the order $10^{-1}$ to $10^{-2}$ microns. This surface roughness requires a sufficient pressure be applied to these surfaces to cause an elastic deformation of the abnormalities such that the surfaces may be brought into proximal contact. Since pressure is a force per unit area, the force required to bring contact surface 22 into proximal contact with reflecting surface 16 can be reduced by reducing contact area 56 of contact surface 22. The beam of light in FTIR device 10 will enter switchplate 20 at contact area 56.

Reducing the size of contact area 56 may be achieved by removing a very small amount, nominally two microns, of contact surface 22 such that proximal contact of switchplate 20 with respect to refractor 12 is limited to contact area 56. Contact area 56 may have many shapes and is not limited to that depicted in FIG. 5. Contact area 56 may be formed by etching contact surface 22 of switchplate 20. Additionally, it is recognized that there are many ways to form a contact area 56, such as by adding a contact shim to reflecting surface 16 of refractor 12 or contact surface 22 of switchplate 20, and then etching the shim to the desired shape.

Figure 6:
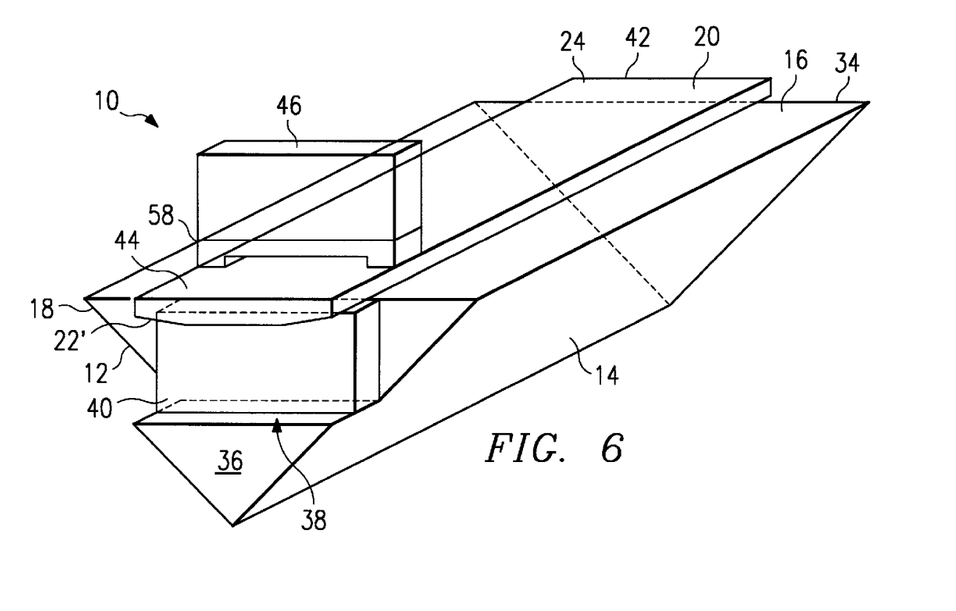
FIG. 6 shows a perspective view of another embodiment of the FTIR device of the present invention.

FIG. 6 shows an end perspective view of FTIR device 10 and illustrates an alternate embodiment of device 10. In discussions relating to the previous FIGURES, various methods were described on how to bring contact surface 22 of switchplate 20 into proximal contact with reflecting surface 16 of refractor 12. FIG. 6 illustrates another embodiment for bringing switchplate 20 into proximal contact with refractor 12. In the embodiment of FTIR device 10 in FIG. 6 contact surface 22' of switchplate 20 is convex. The curve of contact surface 22' produces spacing on the edges of switchplate 20 with respect to refractor 12 on the order of a few wavelengths of the optical beam traveling in FTIR device 10. To depress switchplate 20 having curved contact surface 22', bridge 58 may be required with the use of second actuator 46. The legs of bridge 58 on the edges of switchplate 20 help compress the convex surface of contact surface 22' into proximal contact with reflecting surface 16 of refractor 12. When actuator 46 forces bridge 58 against switchplate 20 the center of surface 22' first comes into proximal contact with reflective surface 16. This reduced area increases the pressure, force per unit area, applied to the contact points between switchplate 20 and refractor 12, and as the force continues switchplate 20 flattens out and conforms to contact surface 16.

Figure 7:
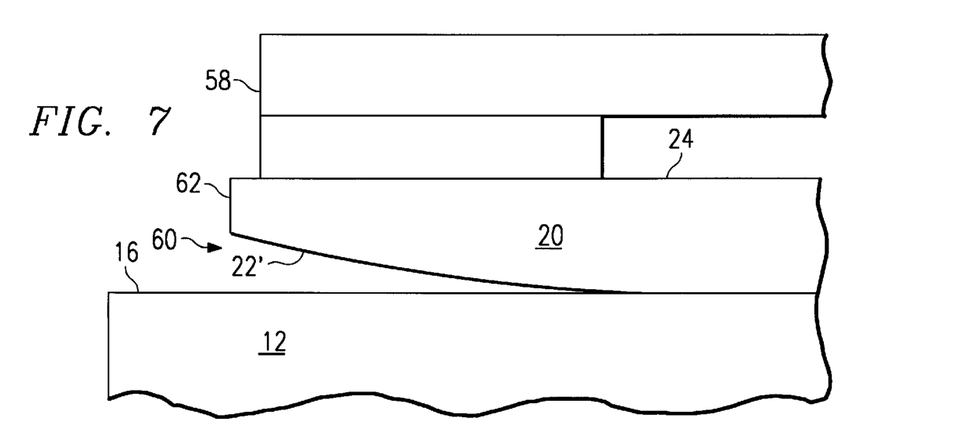
FIG. 7 provides a cross-sectional view of a portion of the FTIR device in FIG. 6.

FIG. 7 shows a cross-sectional expanded view of the alternate embodiment of FTIR device 10 in FIG. 6. FIG. 7 more clearly shows spacing 60 between reflecting surface 22' of switchplate 20 and reflecting surface 16 of refractor 12. When the force from second actuator 46 is released the edges of switchplate 20 as represented by edge 62 in FIG. 7 return to their original shape breaking the electrostatic contact forces between switchplate 20 and refractor 12. This allows actuator 40, as shown in FIGS. 6 and 7, to use less force to separate switchplate 20 from refractor 12 and also to separate them more rapidly. When second actuator 46 is activated to return contact surface 22' of switchplate 20 into proximal contact with reflecting surface 16 of refractor 12, it applies force to bridge 58 that pushes on the opposing edges of switchplate 20. Switchplate 20 moves towards refractor 12 making proximal contact at the center or apex of contact surface 22'. Second actuator 46 initially produces a great force over a small area thereby deforming contact surface 22' such that the electrostatic forces can take effect at the contact point. Once the electrostatic contact has been made between contact surface 22' of switchplate 20 and reflecting surface 16 of refractor 12, then the electrostatic forces tend to spread in a self-initiating manner causing greater contact of switchplate 20 with respect to refractor 12.

As actuator 46 continues to apply force to bridge 16, the forces on switchplate 20 cause it to deform and flatten completely against refractor 12. Resulting in proximal contact between surface 22' of switchplate 20 and reflecting surface 16 of refractor 12. This results in a more complete contact of switchplate 20 to refractor 16 and therefore results in greater frustrated total internal reflection of a beam in device 10. This allows FTIR device 10 to be a more efficient optical switch, modulator, or splitter. Convex contact surface 22' of switchplate 20 may be formed by many methods, including, for example, grinding contact surface 22' of switchplate 20 to the desired convex surface. Alternatively, convex contact surface 22' may be formed by placing a convex refracting element on only a portion of contact surface 22 of switchplate 20.

Figure 8A:
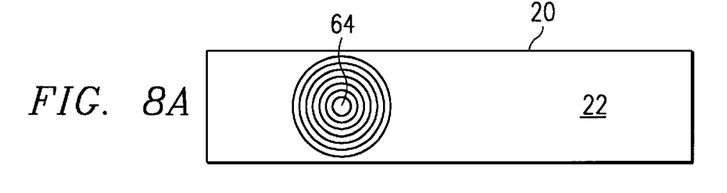
FIGS. 8A and 8B depict a switchplate of the present FTIR device incorporating a lens into the switchplate.
Figure 8B:
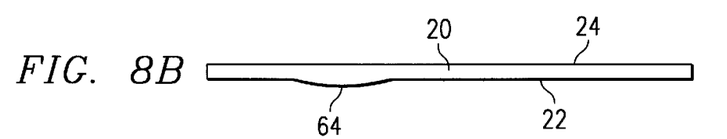

FIG. 8A illustrates one method for forming convex contact surface 22' of FIGS. 6 and 7. FIG. 8A is a bottom view of switchplate 20 having a lens or convex refracting element 64 thereon. Convex refracting element 64 covers only a portion of contact surface 22 of switchplate 20 and provides convex contact surface 22' of FIGS. 6 and 7. Convex refracting element 64 may be formed in contact surface 22 by many methods, including, for example, grinding, polishing, or etching contact surface 22, or alternatively, may be a separate convex refracting element 64 that is bonded to surface 22 of switchplate 20 by an appropriate optically transparent agent. FIG. 8B shows a side view of switchplate 20 of FIG. 8A having convex refracting element 64.

Figure 9:
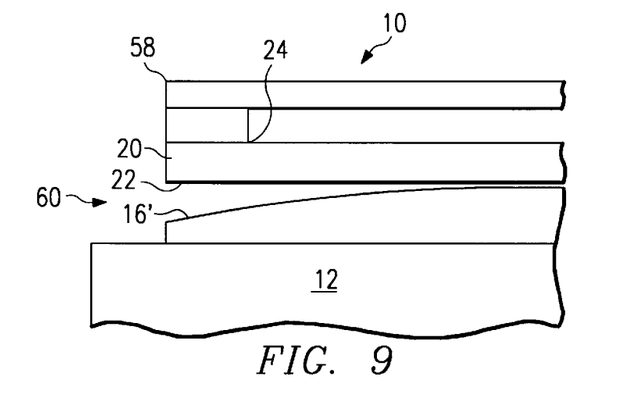
FIG. 9 depicts a cross-sectional view of a portion of an alternate embodiment of the FTIR device of the present invention.

FIG. 9 illustrates a cross-sectional expanded view of an alternate embodiment of FTIR device 10 for achieving the advantages of a curved contact surface between switchplate 20 and refractor 12. In the embodiment of FIG. 9, the curved surface is formed in reflecting surface 16' of refractor 12. FTIR device 10 of FIG. 9 operates substantially in the same way as s FTIR device 10 in FIGS. 6 and 7. Because reflecting surface 16' is curved with respect to contact surface 22 of switchplate 20, the amount of force required to bring the surfaces into proximal contact with one another and to later separate the surfaces is greatly reduced over prior known FTIR devices.

Forming convex surface 16' on reflecting surface 16 of refractor 12 may be accomplished by many methods. Reflecting surface 16, for example, can be ground to form the convex surface. Alternatively, the convex surface may be formed by placing a convex refractive element on reflecting surface 16 of refractor 12.

Figure 10A:
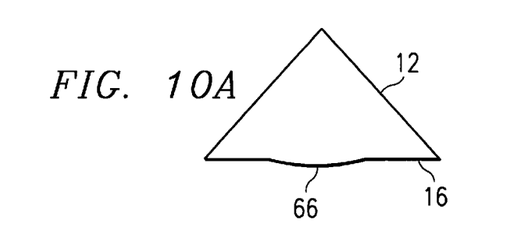
FIGS. 10A and 10B depict a refractor of the present FTIR device incorporating a lens into the surface of the refractor.
Figure 10B:
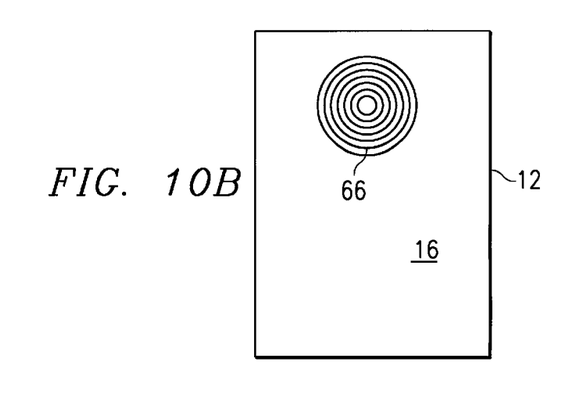

FIGS. 10A and 10B show the formation of convex reflecting surface on refractor 12 through the use of a lens or convex refracting element 66 that is placed on reflecting surface 16. FIG. 10A is a side cross-sectional view of refractor 12 showing a typical convex refracting element 66 on reflecting surface 16 of refractor 12. Axial distance between the apex and the edge of convex refracting element 66 is nominally three microns. FIG. 10B shows a top view of refractor 12 having a convex surface formed by convex refracting element 66.

Figure 11:
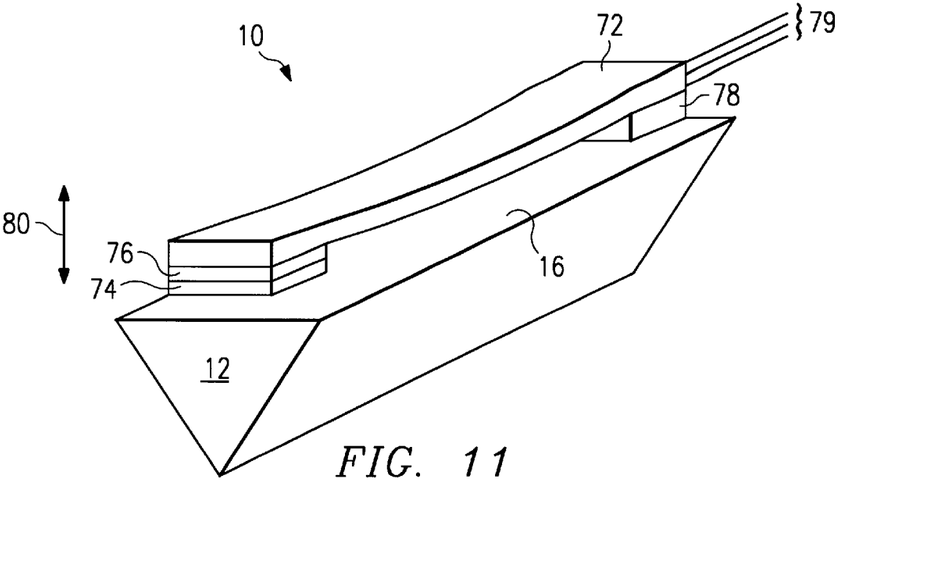
FIG. 11 shows a perspective view of another embodiment of the FTIR device of the present invention.
Figure 12:
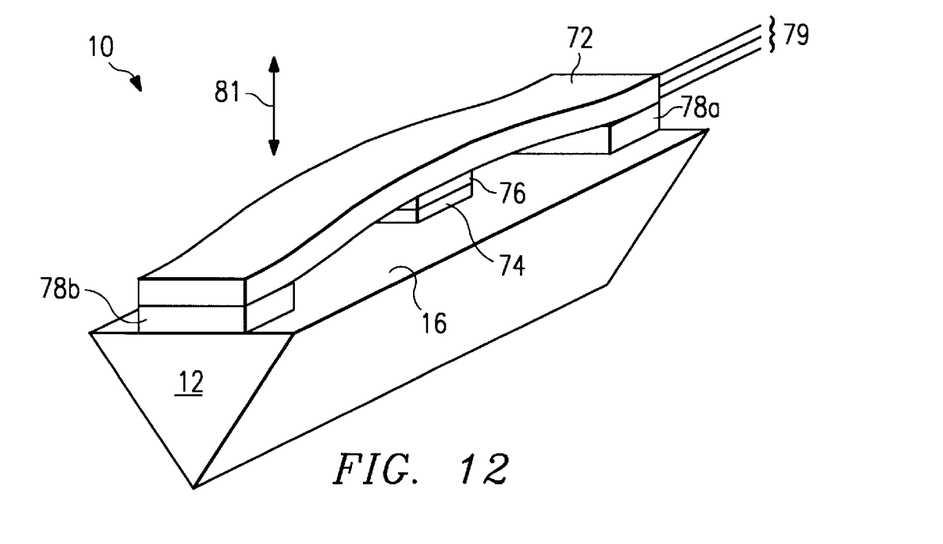
FIG. 12 shows a perspective view of yet another embodiment of the FTIR device of the present invention.

FIGS. 11 and 12 illustrate alternative embodiments of FTIR device 10 that operate in a similar manner described above with reference to FIG. 1 using a bimorph transducer 72. Previous embodiments of the invention use an actuator 40 to push switchplate 20. In certain applications, such an arrangement of components in FTIR device may cause a less efficient coupling between transducer forces and contact forces. In addition, an undesirable oscillation of switchplate 20 may contribute to switch bounce and the difficulty of maintaining a required gap between refractor 12 and switchplate 20 despite the oscillations. Also, the arrangement of some of the previous embodiments used an opposing force to bring switchplate 20 in proximal contact with refractor 12. Therefore, to open switchplate 20, the force applied not only had to overcome electrostatic bonding forces between refractor 12 and switchplate 20, but also the opposing force that was applied to close switchplate 20. FTIR devices 10 described with reference to FIGS. 11 and 12 overcome some of these limitations.

Referring now to FIG. 11, FTIR device 10 includes a refractor 12 having a reflecting surface 16. A bimorph transducer 72 is coupled at one end to refractor 12 using a spacer 78. An air gap spacer 76 is coupled to the opposing end of bimorph transducer 72, and a switchplate 74 is coupled to air gap spacer 76. As described with reference to FIG. 1, the reflective surface 24 of switchplate 74 is at a bias angle θ26 with respect to contact surface 22. Switchplate 74 may be placed in a variety of orientations depending on the desired paths of beams 28 and 28' through refractor 12. Spacer 78 may also include this same bias angle to provide a consistent or desired orientation of bimorph transducer 72 with respect to refractor 12.

Bimorph transducer 72 may be constructed from a piezoelectric material, dissimilar metals, or other suitable material that changes physical properties in response to an electrical, thermal, or other appropriate control signal. In one embodiment, bimorph transducer 72 comprises the following series of layers: a first conductive layer, a first piezoelectric layer, a second conductive layer, a second piezoelectric layer, and a third conductive layer. The conductive layers are coupled to leads 79 to impart a voltage potential across the piezoelectric layers. For example, one potential is applied to a first pair of leads 79 to cause first piezoelectric layer to shorten, while another potential is applied to a second pair of leads 79 to cause second piezoelectric layer to lengthen. The potentials applied to leads 79 comprise the control signal to bimorph transducer. Depending on the polarity of the control signal, bimorph transducer 72 deflects in the direction indicated by arrow 80.

In operation, a control signal of a first polarity causes the opposing or uncoupled end of bimorph transducer 72 to bend towards refractor 12 to place switchplate 74 in proximal contact with reflecting surface 16 and to apply a force to contact surface 22. In a particular embodiment, bimorph transducer 72 applies enough pressure to deform the irregularities on the surfaces of switchplate 74 and refractor 12 such that an electrostatic bond is formed between those surfaces. When the control signal to bimorph transducer 72 is returned to zero, the surfaces of refractor 12 and switchplate 74 remain in proximal contact to frustrate the total internal reflection. A control signal of a second polarity causes bimorph transducer 78 to generate sufficient force to break the electrostatic bond and space apart switchplate 74 and refractor 12.

FTIR device 10 may also include a conductive element 50 and a second conductive reference 52 to form a capacitor for controlling the distance between switchplate 74 and reflecting surface 16, as described above with reference to FIG. 4. In one embodiment, conductive element 50 is placed on at least a portion of contact surface 22. For example, conductive element 50 may be placed on the portion of contact surface 22 that does not include contact area 56. Similarly, second conductive reference 52 in this embodiment is placed on a portion of reflecting surface 16 that does not come into proximal contact with contact area 56 of switchplate 74. In another embodiment, conductive element 50 may be placed on bimorph transducer 72, air gap spacer 76, or in any other appropriate location that changes position with the deflection of bimorph transducer 72.

FIG. 12 illustrates an alternative embodiment of FTIR device 10 using bimorph transducer 72. In this embodiment, both ends of bimorph transducer 72 are coupled to refractor 12 using spacers 78a and 78b. A switchplate 74 and air gap spacer 76 are coupled to bimorph transducer 72 between spacers 78a and 78b. In this embodiment, the same control signal on bimorph transducer 72 produces four times the force with one-fourth the displacement indicated by arrow 81 as the cantilever configuration of FIG. 11.

Figure 13:
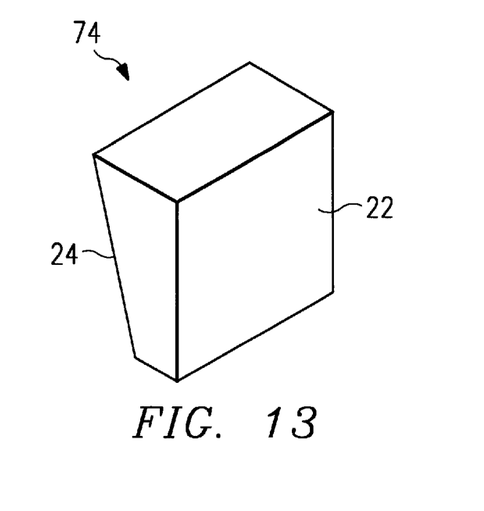
FIGS. 13–15 illustrate different embodiments of a switchplate adapted to the FTIR devices of FIGS. 11 and 12.
Figure 14:
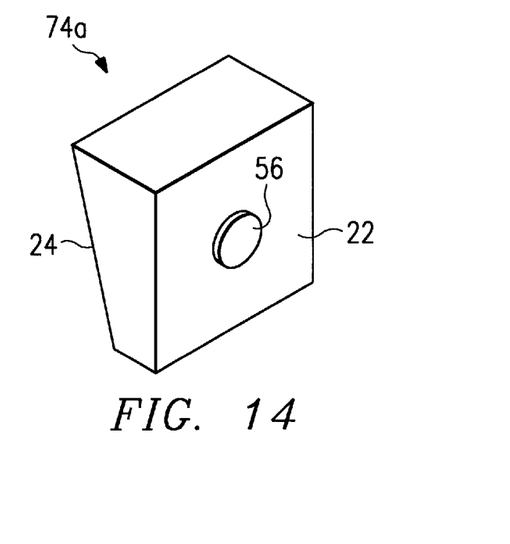
Figure 15:
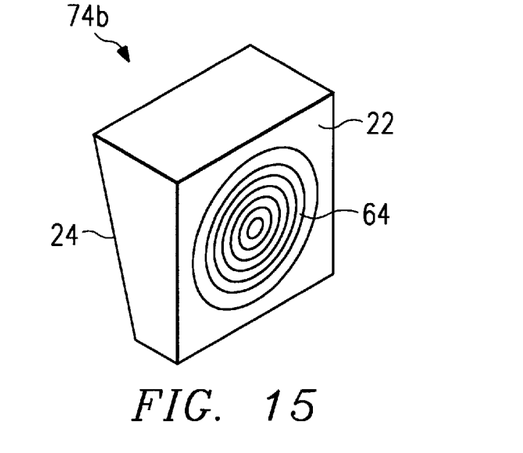

FIGS. 13–15 illustrate different embodiments of switchplate 74 adapted to the FTIR device 10 of FIGS. 11 and 12. FIG. 13 illustrates switchplate 74 having a contact surface 22 and a reflective surface 24. Switchplate 74 operates in a similar manner to switchplate 20 shown in FIGS. 1 and 2 but may be shorter in length and is coupled to bimorph transducer 72 instead of refractor 12. FIG. 14 illustrates switchplate 74a with contact surface 22 having a contact area 56 for proximally contacting refractor 12. Contact area 56 is a portion of the total area of contact surface 22. FIG. 15 illustrates switchplate 74b in which contact surface 22 includes a convex refracting element 64, similar to the one shown in FIGS. 8A and 8B above.

Figure 16:
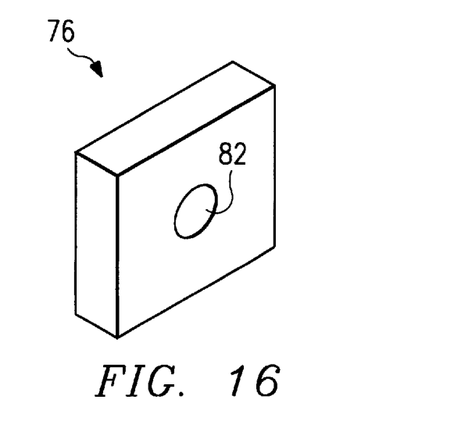
FIG. 16 illustrates an air gap spacer adapted to the FTIR devices of FIGS. 11 and 12.

FIG. 16 illustrates air gap spacer 76 having a hole 82 to provide an air gap behind the working area of switchplate 74 to facilitate frustrated total internal reflection. Alternatively, hole 82 may represent any suitable material with a lower index of refraction to provide the appropriate optical characteristics for frustrated total internal reflection. In one embodiment, air gap spacer 76 may not have hole 82, and a reflective coating could be applied to reflective surface 24 of switchplate 74 instead. Also, air gap spacer 76 and switchplate 74 may be integral or separate components. The sizing of hole 82 may adjust the compression dynamics of the switchplate 74 and air gap spacer 76 assembly to provide advantages in the operation of FTIR device 10. Specifically, the ratio of the diameter of hole 82 to the diameter of contact area 56 may be adjusted such that the ratio of peal to sheer force can be adjusted in breaking the electrostatic bond between switchplate 20 and refractor 12. This results in less force required and higher speed and reliability in operation of FTIR device 10.

Figure 17:
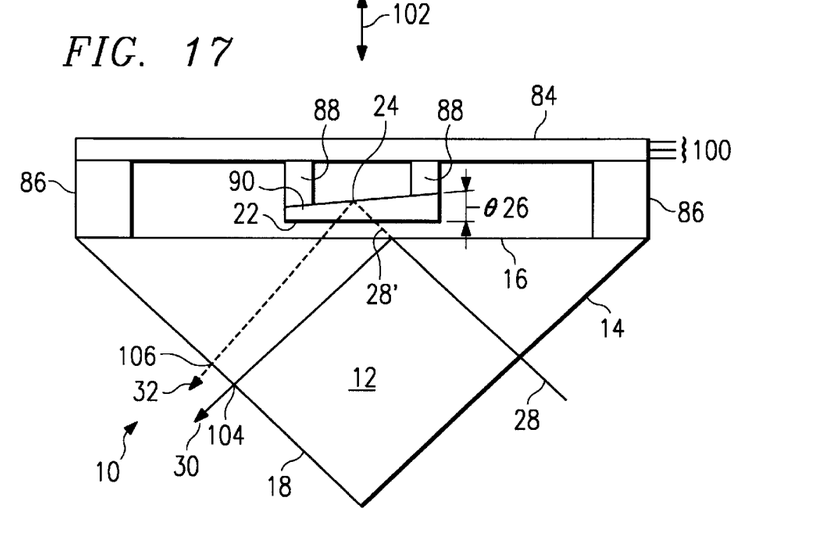
FIG. 17 provides a cross-sectional view of another embodiment of the FTIR device of the present invention.

FIG. 17 illustrates an alternative embodiment of FTIR device 10 that operates in a similar manner described above with reference to FIGS. 1 and 12 using a bimorph transducer 84. One embodiment of the invention described above with reference to FIG. 12 uses a bimorph transducer 72 with a portion of its periphery coupled to refractor 12. In particular, the ends of bimorph transducer 72 are coupled to refractor 12 using spacers 78a and 78b. FTIR device 10 shown in FIG. 17 depicts an alternative embodiment which concentrates a force to bring a switchplate 90 into and out of proximal contact with refractor 12.

Referring now to the cross-sectional view illustrated in FIG. 17, FTIR device 10 includes a refractor 12 having an input surface 14, a reflecting surface 16, and an output surface 18. A spacer 86 couples at one end to refractor 12. A bimorph transducer 84 couples to spacer 86 forming a chamber defined by spacer 86, transducer 84, and reflective surface 16 of refractor 12. Another spacer 88 couples at one end to the inner surface of transducer 84. In a particular embodiment, spacers 86 and 88 are concentric, annular members formed of glass, ceramic, metal, or other appropriate material.

Spacer 88 couples to the periphery of switchplate 90 having a contact surface 22 and a reflective surface 24 to form a chamber defined by spacer 88, transducer 84, and reflective surface 24 of switchplate 90. As described with reference to FIG. 1, reflective surface 24 of switchplate 90 is at a bias angle θ26 with respect to contact surface 22 of switchplate 90. Switchplate 90 may be placed in a variety of orientations depending on the desired paths of beams 28, 28', 30, and 32 through refractor 12 and switchplate 90. For example, switchplate 90 may be placed in a particular position so that beam 30 exits output surface 18 of refractor 12 at a first position 104, and beam 32 exits at a second position 106. In one embodiment, as discussed with reference to FIG. 5, a portion of contact surface 22 comprises contact area 56 such that proximal contact of switchplate 90 with respect to refractor 12 is limited to contact area 56. Switchplate 90 may be circular in shape to accommodate the embodiment with concentric, annular spacers 86 and 88.

Bimorph transducer 84 may be constructed from a piezoelectric material, dissimilar metals, or other suitable material that changes physical properties in response to an electrical, thermal, or other appropriate control signal. In one embodiment, bimorph transducer 84 comprises the following series of layers: a first conductive layer, a first piezoelectric layer, a second conductive layer, a second piezoelectric layer, and a third conductive layer. Conductive layers are coupled to leads 100 to impart a voltage potential across the piezoelectric layers. For example, a first piezoelectric layer shortens in response to a potential applied to a first pair of leads 100, while a second piezoelectric layer lengthens in response to another potential applied to a second pair of leads 100. The potentials applied to leads 100 comprise the control signal to bimorph transducer 84. Depending on the polarity of the control signal, bimorph transducer 84 deflects in the direction indicated by arrow 102. In the circular embodiment of FTIR device 10, the movement of transducer 84 in response to control signals resembles a drum or diaphragm that experiences larger translations in the middle than on the edges. As a result, the surface of transducer 84 deflects in an increasing amount as a function of the distance from spacer 86 to the center of transducer 84.

In one embodiment, the cylindrical chamber formed within spacers 86 and 88, transducer 84, and refractor 12 may be filled with any suitable material or gas, such as nitrogen or argon, to optimize the optical characteristics of FTIR device 10. Similarly, the chamber formed within the spacer 88, transducer 84, and switchplate 90 may also be filled with any suitable material or gas. These chambers substantially eliminate the attachment of contaminants or moisture to contact surface 22 of switchplate 90, reflective surface 24 of switchplate 90, or refractor 12. Consequently, FTIR device 10 operates more accurately and requires less cleaning or maintenance.

In operation, a control signal of a first polarity causes transducer 84 to bend towards reflecting surface 16 of refractor 12 to place switchplate 90 into proximal contact with reflecting surface 16. In one embodiment, the centering of spacer 88 and switchplate 90 equidistant from the edges of bimorph transducer 84 causes transducer 84 to concentrate a force substantially upon spacer 88 and switchplate 90. When the control signal to transducer 84 is returned to zero, the surfaces of refractor 12 and switchplate 90 remain in proximal contact to frustrate the total internal reflection of beam 28. In response to a control signal of a second polarity, transducer 84 generates a sufficiently concentrated force upon spacer 88 and switchplate 90 to break the electrostatic bond more efficiently and space apart switchplate 90 from refractor 12.

Figure 18:
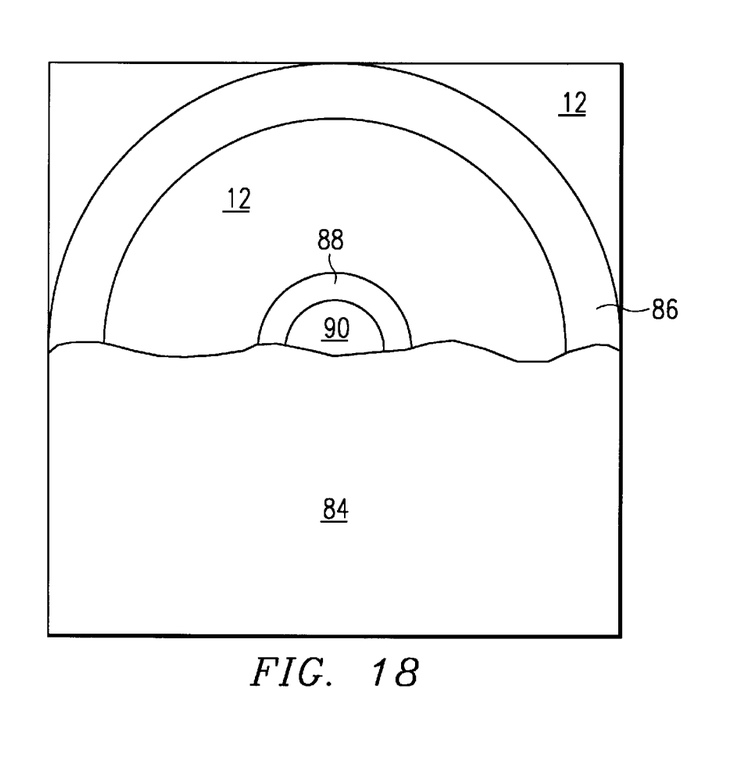
FIG. 18 provides a top view of the FTIR device in FIG. 17.

FIG. 18 illustrates a top view of a concentric or circular embodiment of FTIR device 10 of FIG. 17, which shows a portion of transducer 84 removed to expose the concentric arrangement of annular spacers 86 and 88, and the centering of spacer 88 and switchplate 90 at an equal distance from the edges of transducer 84. In this arrangement, transducer 84 concentrates forces on spacer 88 and switchplate 90. Also, this concentric arrangement provides a first chamber defined by spacer 86, transducer 84, and refractor 12, and a second chamber defined by spacer 88, transducer 84, and switchplate 90.

Figure 19:
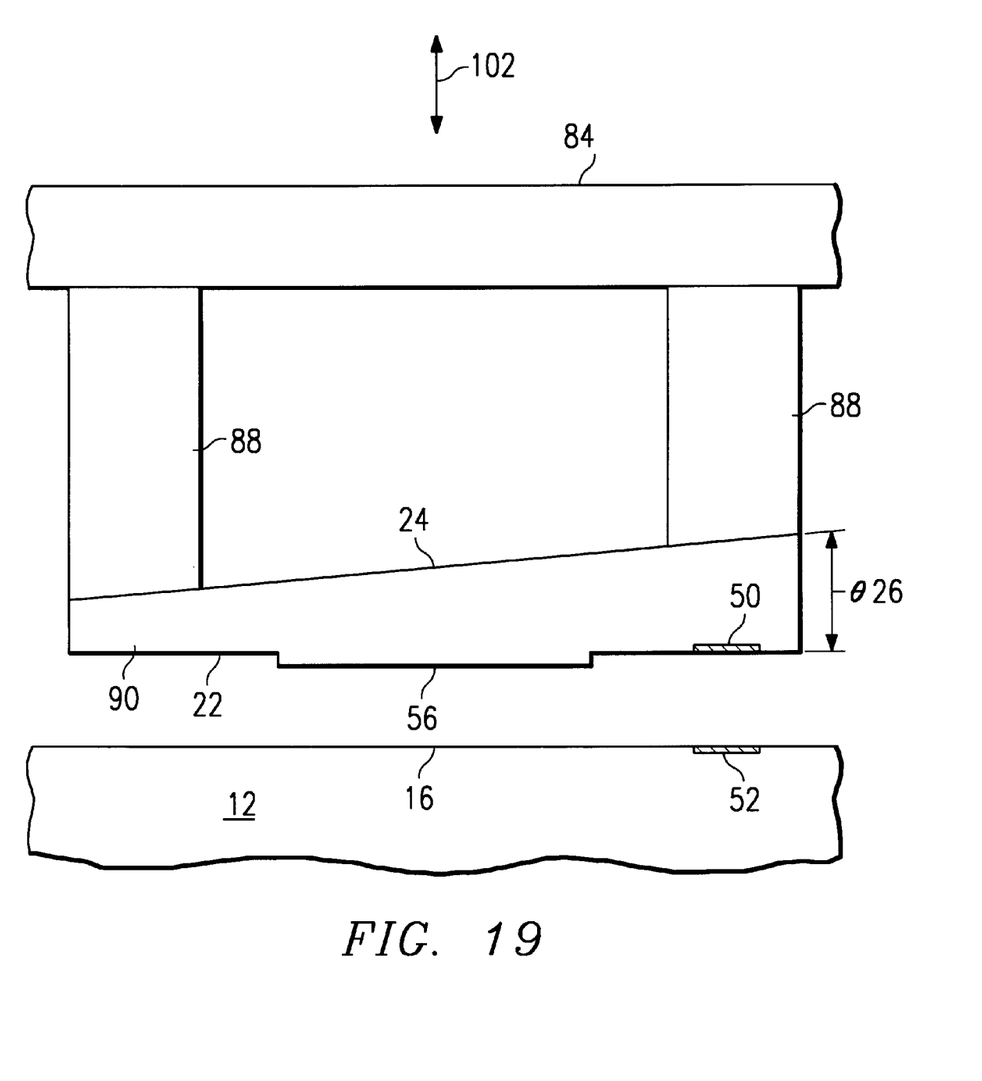
FIG. 19 illustrates, in more detail, a portion of the FTIR device of FIG. 17.

Now referring to FIG. 19, the positioning of spacer 88 along the periphery of switchplate 90 further improves the operating characteristics of FTIR device 10. In operation, spacer 88 concentrates the force applied by transducer 84 upon the periphery of switchplate 90. This force bends the periphery of switchplate 90, creating peel forces which break the electrostatic bond between contact surface 22 of switchplate 90 and reflecting surface 16 of refractor 12. The concentrated forces applied by transducer 84 and spacer 88, therefore, cause switchplate 90 to peel away from refractor 12 rather than sheer away from refractor 12.

In one embodiment, switchplate 90 may include contact area 56 that comes into proximal contact with refractor 12. Switchplate 90 with contact area 56 requires less force to break the electrostatic bond with refractor 12 than switchplate 90 whose entire contact surface is in proximal contact with refractor 12. Furthermore, spacer 88 concentrates the force applied by transducer 84 to the portion of contact surface 22 that is not in proximal contact with refractor 12, and the periphery of switchplate 90 bends more easily in response to these forces. This configuration promotes the creation of additional peel forces upon contact area 56.

The centering of switchplate 90 equidistant from the edges of transducer 84, the positioning of spacer 88 along the periphery of switchplate 90, and the addition of contact area 56 to contact surface 22 of switchplate 90, all comprise enhancements that individually and in combination improve the overall performance of FTIR device 10. Specifically, these enhancements efficiently provide the proper amount of force to bring switchplate 90 into and out of proximal contact with refractor 12. They also reduce the time necessary to move switchplate 90 with respect to refractor 12.

FTIR device 10 may also include conductive elements 50 and 52 to form a capacitor for sensing and controlling the distance between switchplate 90 and reflecting surface 16, as described above with reference to FIG. 4. In one embodiment, conductive element 50 is placed on at least a portion of contact surface 22. For example, conductive element 50 may be placed on the portion of contact surface 22 that does not include contact area 56 of switchplate 90. Similarly, conductive element 52 in this embodiment is placed on a portion of reflecting surface 16 that does not come into proximal contact with contact area 56 of switchplate 90. FTIR device 10 may generate control signals in response to the capacitance formed by conductive elements 50 and 52, to accurately position switchplate 90.

Figure 20:
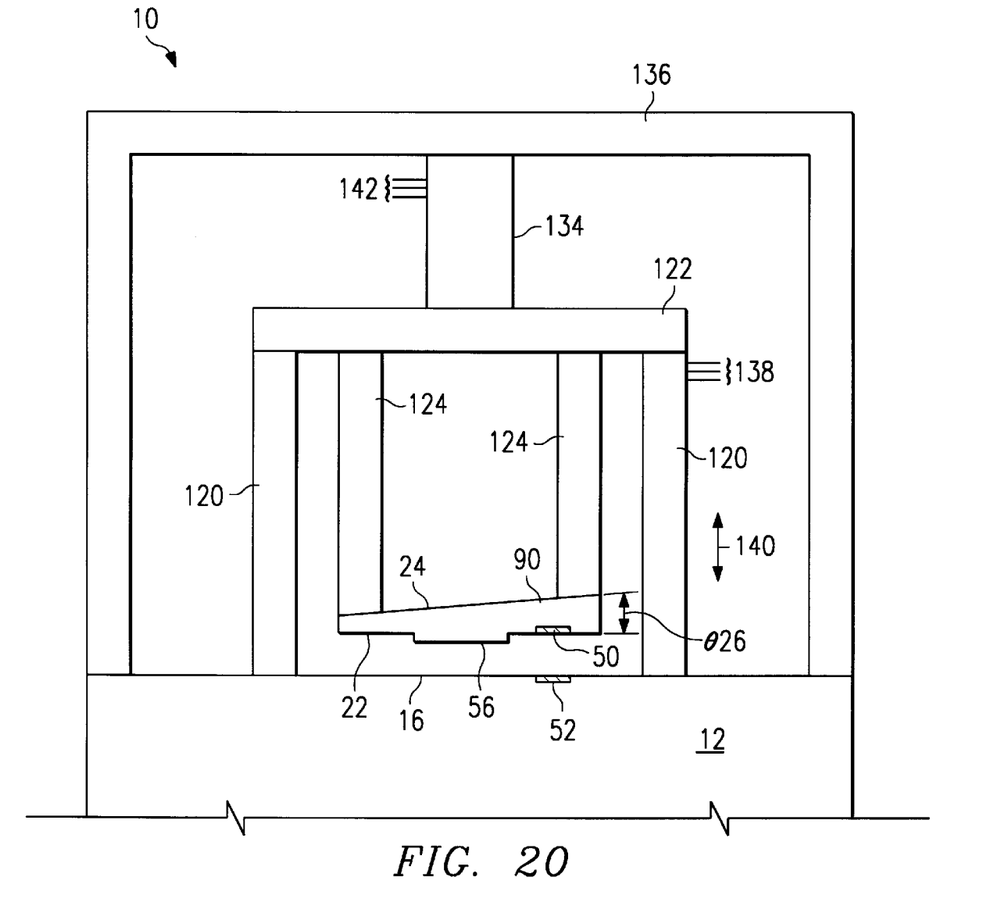
FIG. 20 provides a cross-sectional view of another embodiment of the FTIR device of the present invention.

FIG. 20 illustrates a cross-sectional view of an alternative embodiment of FTIR device 10 that operates in a similar manner described above with reference to FIG. 1 and includes refractor 12 having a reflecting surface 16. A transducer 120 couples at one end to refractor 12. An endplate 122 couples to the opposing end of transducer 120 forming a chamber. A spacer 124 couples the periphery of switchplate 90 to endplate 122 forming another chamber. In a particular embodiment, transducer 120, endplate 122, spacer 124, and switchplate 90 have a concentric or circular arrangement when viewed from the top.

Transducer 120 may be constructed from a piezoelectric material, magneto-constrictive device, or other suitable material that changes physical properties in response to an electrical, thermal, or other appropriate control signal. In one embodiment, transducer 120 comprises an annular piezoelectric stack that changes its axial length in response to control signals applied to leads 138, as indicated by arrow 140. The piezoelectric stack may comprise three conductive layers sandwiching two piezoelectric layers.

In operation, a control signal of a first mode causes transducer 120 to lengthen in axial length to space apart switchplate 90 from refractor 12. A mode is some combination of voltages applied on two or more conductive layers of transducer 120. In response to the control signal returning to zero or a control signal of a second mode, transducer 120 shortens in axial length to place switchplate 90 into proximal contact with reflecting surface 16. The force applied by transducer 120 deforms the irregularities on the surfaces of switchplate 90 and refractor 12 to form an electrostatic bond and to frustrate the total internal reflection of beam 28.

In one embodiment, FTIR device 10 may also include a second transducer 134 having one end coupled to endplate 122 and an opposite end coupled to member 136. Member 136 also couples to refractor 12. Transducer 134 may have a variety of constructions like transducer 120 that provide an additional driving force to move switchplate 90 into and out of proximal contact with refractor 12 in response to a control signal applied to leads 142. Using both transducers 120 and 134 to drive switchplate 90 increases the speed at which switchplate 90 can be moved with respect to refractor 12.

The positioning of spacer 124 along the periphery of switchplate 90 creates peel forces in a similar manner and with a similar result as those described with reference to FIG. 19. Transducers 120 and 134 and spacer 124 apply additional peel forces to switchplate 90 if switchplate 90 includes contact area 56. Furthermore, FTIR device 10 of FIG. 20 may also include conductive elements 50 and 52 for sensing and controlling the distance between switchplate 90 and reflecting surface 16, as described above with reference to FIG. 19. Moreover, the chambers defined by the configuration of FTIR device 10 of FIG. 20 evacuate contaminants and moisture so that FTIR device 10 operates more accurately and requires less cleaning or maintenance. The chambers may also contain any suitable gas or material to optimize the optical characteristics of FTIR device 10.

Figure 21:
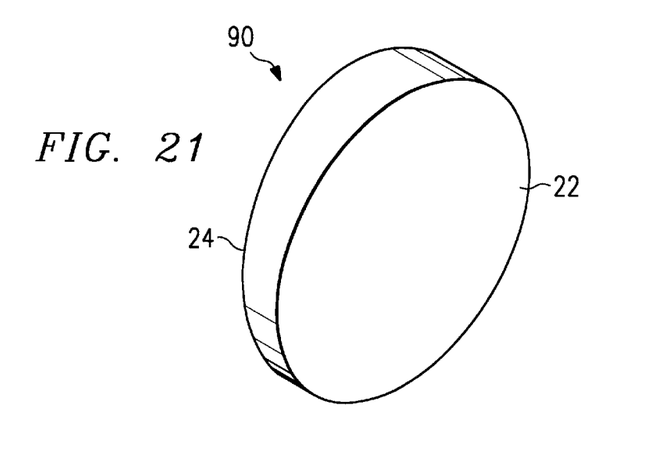
FIGS. 21–23 illustrate different embodiments of a switchplate adapted to the FTIR devices of FIGS. 17 and 20.
Figure 22:
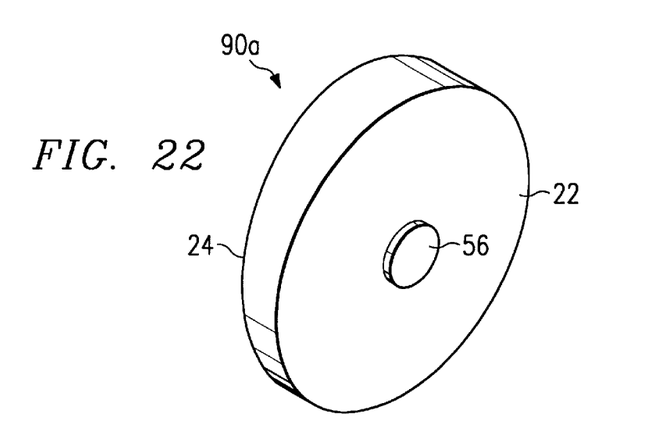
Figure 23:
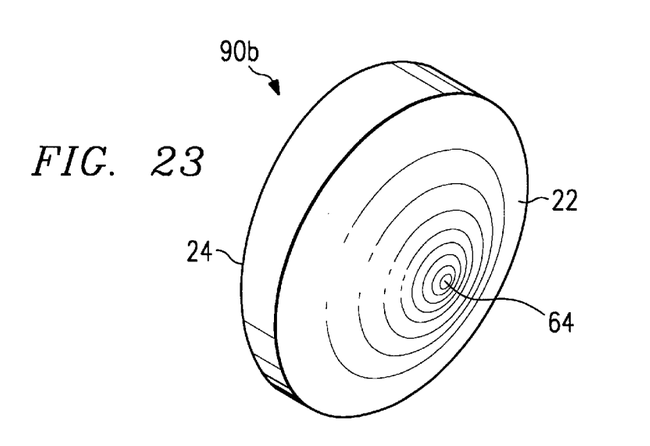

FIGS. 21–23 illustrate different embodiments of switchplate 90 adapted to FTIR devices 10 of FIGS. 17 and 20. FIG. 21 illustrates a circular switchplate 90 having contact surface 22 and reflective surface 24. Switchplate 90 operates in a similar manner to switchplate 20 shown in FIGS. 1 and 2 but may be circular in shape and is coupled to either spacer 88 or 124 instead of refractor 12. FIG. 22 illustrates switchplate 90a with contact surface 22 having contact area 56 for proximally contacting refractor 12. Contact area 56 is a portion of the total area of contact surface 22. FIG. 23 illustrates switchplate 90b in which contact surface 22 includes a convex refracting element 64, similar to the one shown in FIGS. 8A and 8B above.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A device for processing an optical signal, comprising:
   a refractor having a reflecting surface operable to reflect the optical signal by total internal reflection;
   an actuator having one end coupled to the refractor and an opposing end;
   an endplate having a surface coupled to the opposing end of the actuator;
   a spacer having one end coupled to the surface of the endplate and an opposing end;
   a switchplate coupled to the opposing end of the spacer, the switchplate having a first position spaced apart from the refractor and a second position in proximal contact with the refractor to frustrate the total internal reflection of the optical signal.

2. The device of claim 1, wherein the spacer comprises an annular member.

3. The device of claim 1, wherein the spacer is made of glass.

4. The device of claim 1, wherein the switchplate circular.

5. The device of claim 1, wherein the actuator is cylindrical.

6. The device of claim 1, wherein:
   the actuator, the endplate, and the refractor define a first chamber; and
   the spacer, the endplate, and the switchplate define a second chamber.

7. The device of claim 1, wherein the actuator comprises a piezoelectric transducer operable to position the switchplate in a selected one of the first position and the second position in response to a control signal.

8. The device of claim 1, wherein the switchplate further comprises a contact surface having a contact area operable proximally to contact the refractor, the contact area being a portion of the total area of the contact surface.

9. The device of claim 1, wherein the switchplate further comprises a contact surface, and wherein one of the contact surface of the switchplate and the reflecting surface of the refractor is convex.

10. The device of claim 1, wherein the switchplate further comprises:
    a contact surface operable proximally to contact the refractor; and
    a reflective surface having a bias angle with respect to the contact surface.

11. The device of claim 1, wherein the refractor is a prism.

12. The device of claim 1, wherein the one end of the actuator is coupled to the reflecting surface of the refractor.

13. The device of claim 1, further comprising:
    a first conductive element on the switchplate; and
    a second conductive element displaced from the first conductive element, wherein the first and second conductive elements form a capacitor having a capacitance which represents the spacing between the switchplate and the refractor.

14. The device of claim 1, further comprising:
    a second actuator having one end coupled to an opposing surface of the endplate, and an opposing end; and
    a support member coupled to the refractor and the opposing end of the second actuator.

15. A method for frustrating the total internal reflection of an optical signal comprising the steps of:
    providing an optical signal at an input surface of a refractor;
    reflecting the optical signal at a reflective surface of the refractor by total internal reflection such that the optical signal exits the refractor at a first position on an output surface of the refractor;
    activating an actuator in response to a control signal;
    displacing an endplate coupled to the actuator and a spacer coupled to the endplate in response to activating the actuator;
    placing a switchplate coupled to the spacer in proximal contact with the reflective surface of the refractor in response to displacing the endplate and the spacer; and
    reflecting the optical signal at a reflective surface of the switchplate such that the optical signal exits the refractor at a second position on the output surface of the refractor.

16. The method of claim 15, wherein the step of activating an actuator comprises activating a piezoelectric device.

17. The method of claim 15, wherein the step of activating an actuator comprises:
    activating a first transducer coupled to the endplate; and
    activating a second transducer coupled to the endplate and a support member.

18. The method of claim 15, wherein the switchplate comprises:
    a contact surface; and
    a reflective surface having a bias angle with respect to the contact surface.

19. The method of claim 15, wherein the refractor comprises a reflective surface coated with an optically absorptive or optically reflective material.

20. A device for processing an optical signal, comprising:
    a refractor having a reflecting surface operable to reflect the optical signal by total internal reflection;
    a cylindrical piezoelectric transducer stack having one end coupled to the refractor and an opposing end;
    an endplate having a surface coupled to the opposing end of the transducer stack;
    an annular glass spacer having one end coupled to the surface of the endplate and an opposing end;
    a circular switchplate coupled to the opposing end of the spacer along the periphery of the switchplate, the switchplate having a first position spaced apart from the refractor and a second position in proximal contact with the refractor to frustrate the total internal reflection of the optical signal.

21. The device of claim 20, wherein the switchplate further comprises:
    a contact surface having a contact area for proximally contacting the refractor, the contact area being a portion of the total area of the contact surface; and
    a reflective surface having a bias angle with respect to the contact surface.

22. The device of claim 20, wherein the switchplate further comprises a contact surface, and wherein one of the contact surface of the switchplate and the reflecting surface of the refractor is convex.

23. The device of claim 20, wherein the refractor is a prism.

24. The device of claim 20, further comprising:
   a first conductive element on the switchplate; and
   a second conductive element displaced from the first conductive element, wherein the first and second conductive elements form a capacitor having a capacitance which represents the spacing between the switchplate and the refractor.

25. The device of claim 20, further comprising:
   a second piezoelectric transducer stack having one end coupled to an opposing surface of the endplate, and an opposing end; and
   a support member coupled to the refractor and the opposing end of the second piezoelectric transducer stack.

* * * * *